United States Patent [19]
Jagadish et al.

[11] Patent Number: 6,125,173
[45] Date of Patent: *Sep. 26, 2000

[54] CUSTOMER PROFILE BASED CUSTOMIZED MESSAGING

[75] Inventors: Hosagrahar V. Jagadish; Inderpal S. Mumick, both of Berkeley Heights, N.J.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,047

[22] Filed: May 21, 1997

[51] Int. Cl.$^7$ .................................................. H04M 15/00
[52] U.S. Cl. ........................... 379/112; 379/114; 379/124; 379/126; 379/127
[58] Field of Search ................................. 379/67, 88, 89, 379/111, 112, 114, 115, 121, 125, 126, 143, 144, 124, 127; 455/406, 407, 408

[56] References Cited

U.S. PATENT DOCUMENTS

| | | | |
|---|---|---|---|
| 4,979,207 | 12/1990 | Baum et al. | 379/112 |
| 5,146,491 | 9/1992 | Silver et al. | 379/114 |
| 5,222,125 | 6/1993 | Creswell et al. | 379/67 |
| 5,291,543 | 3/1994 | Freese et al. | 379/114 |
| 5,381,467 | 1/1995 | Rosinski et al. | 379/121 |
| 5,384,831 | 1/1995 | Creswell et al. | 379/67 |
| 5,408,526 | 4/1995 | McFarland et al. | 379/114 |
| 5,450,477 | 9/1995 | Amarant et al. | 379/144 |
| 5,506,893 | 4/1996 | Buscher et al. | 379/114 |
| 5,515,425 | 5/1996 | Penzias et al. | 379/114 |
| 5,544,229 | 8/1996 | Creswell et al. | 379/67 |
| 5,553,131 | 9/1996 | Minervino, Jr. et al. | 379/221 |
| 5,557,664 | 9/1996 | Burns et al. | 379/114 |
| 5,568,541 | 10/1996 | Greene | 379/114 |
| 5,570,417 | 10/1996 | Byers | 379/115 |
| 5,577,101 | 11/1996 | Böhm | 379/121 |
| 5,579,379 | 11/1996 | D'Amico et al. | 379/112 |
| 5,581,607 | 12/1996 | Richardson, Jr. et al. | 379/88 |
| 5,592,537 | 1/1997 | Moen | 379/67 |
| 5,627,887 | 5/1997 | Freedman | 379/89 |
| 5,659,601 | 8/1997 | Cheslog | 455/406 |
| 5,844,972 | 12/1998 | Jagadish et al. | 379/114 |
| 5,862,471 | 1/1999 | Tiedemann, Jr. et al. | 455/406 |
| 5,915,006 | 6/1999 | Jagadish et al. | 379/127 |
| 5,982,864 | 11/1999 | Jagadish et al. | 379/115 |
| 5,987,108 | 11/1999 | Jagadish et al. | 379/114 |

FOREIGN PATENT DOCUMENTS

WO95/24093  9/1995  United Kingdom ......... H04M 15/00

*Primary Examiner*—Curtis A. Kuntz
*Assistant Examiner*—Binh K. Tieu
*Attorney, Agent, or Firm*—Morgan & Finnegan, L.L.P.

[57] ABSTRACT

A method and system of telephone call processing that provides information to customers while telephone calls are made. Summary information for a customer is stored. A call from the customer is received alt a network switch. The network switch transmits information identifying the customer to a billing analysis system. The billing analysis system transmits the summary information for the customer to the network switch and an audio message based on the summary information is played to the customer.

27 Claims, 5 Drawing Sheets mer profile databases 114, 116 and 118. As shown in the

CUSTOMER PROFILE BASED CUSTOMIZED MESSAGING

FIELD OF THE INVENTION

The present invention relates to the processing of telephone calls, and in particular, to the billing of the costs of such calls.

BACKGROUND OF THE INVENTION

Discount telephone billing plans can save customers significant amounts of money. However, customers must know about such plans before they can subscribe to them. While advertising is useful in informing customers about discount plans, advertisements lack proximity to telephone calls made by customers. It would be useful to inform customers about discount billing plans at the time telephone calls are made.

SUMMARY OF THE INVENTION

The present invention is a method and system of telephone call processing that provides information to customers while telephone calls are made. The information is provided in the form an audio message that is played to the customer during call setup. The information may include actual and exemplary customer account information, such as the customer's account balance, exemplary balance under an exemplary discount billing plan, saving under an exemplary discount billing plan, etc.

In order to carry out the present invention, summary information for a customer is stored. A call from the customer is received at a network switch. The network switch transmits information identifying the customer to a billing analysis system. The billing analysis system transmits the summary information for the customer to the network switch and an audio message based on the summary information is played to the customer.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1A:
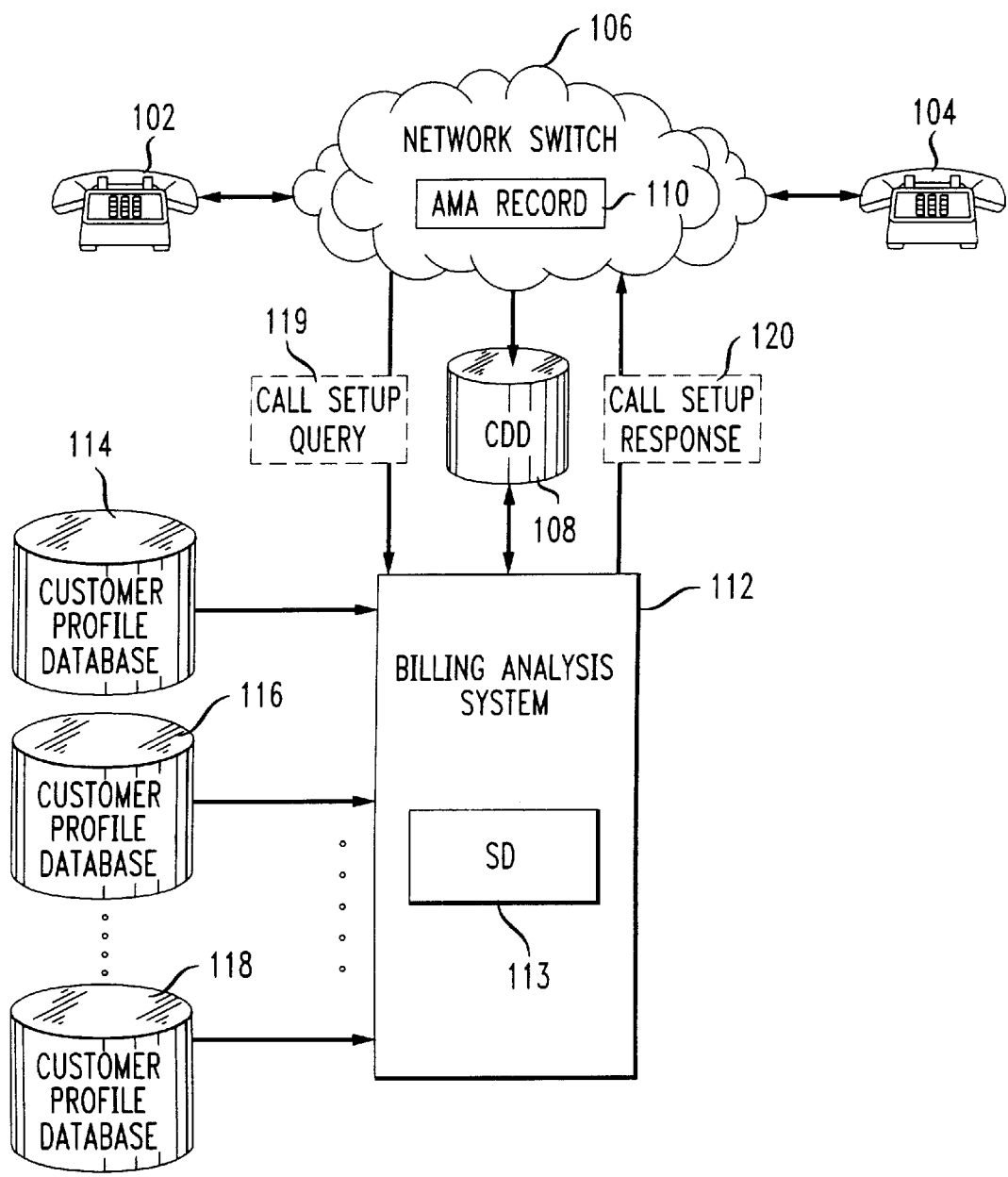
FIG. 1*a* is a block diagram of one embodiment of a telephone call billing system, in which the present invention may be implemented.

Referring to FIG. 1*a*, there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4ESS switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage.

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1*a*, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill. Thus, one type of accumulated summary information may be current bills for each network customer. Nevertheless, it may be useful to accumulate other types of summary information for particular customers. The nature of the accumulated summary information for a particular customer depends upon the services subscribed to by that customer.

For example, a customer may subscribe to a plan in which calls made during the hours between 5:00 pm and 9:00 am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. Once summary information has been stored in SD 113, it is available for immediate access. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

One use for real-time access to summary information involves call setup query 119. When a call is initiated, for example, by telephone station 102, and routed to network switch 106, before the call is connected to the destination station, for example, station 104, switch 106 may transmit a call setup query 119 to billing analysis system 112. The call setup query includes information identifying the customer that placed the call and may also include other information. Typically the Automatic Number Identification (ANI) is used for this purpose. In an ANI system, the number of the telephone station from which a call is initiated is determined and used to identify the party who initiated the call. In response to receiving query 119, billing analysis system 112 may access summary information stored in SD 113 and generate a call setup response 120 based on the summary information.

Figure 1B:
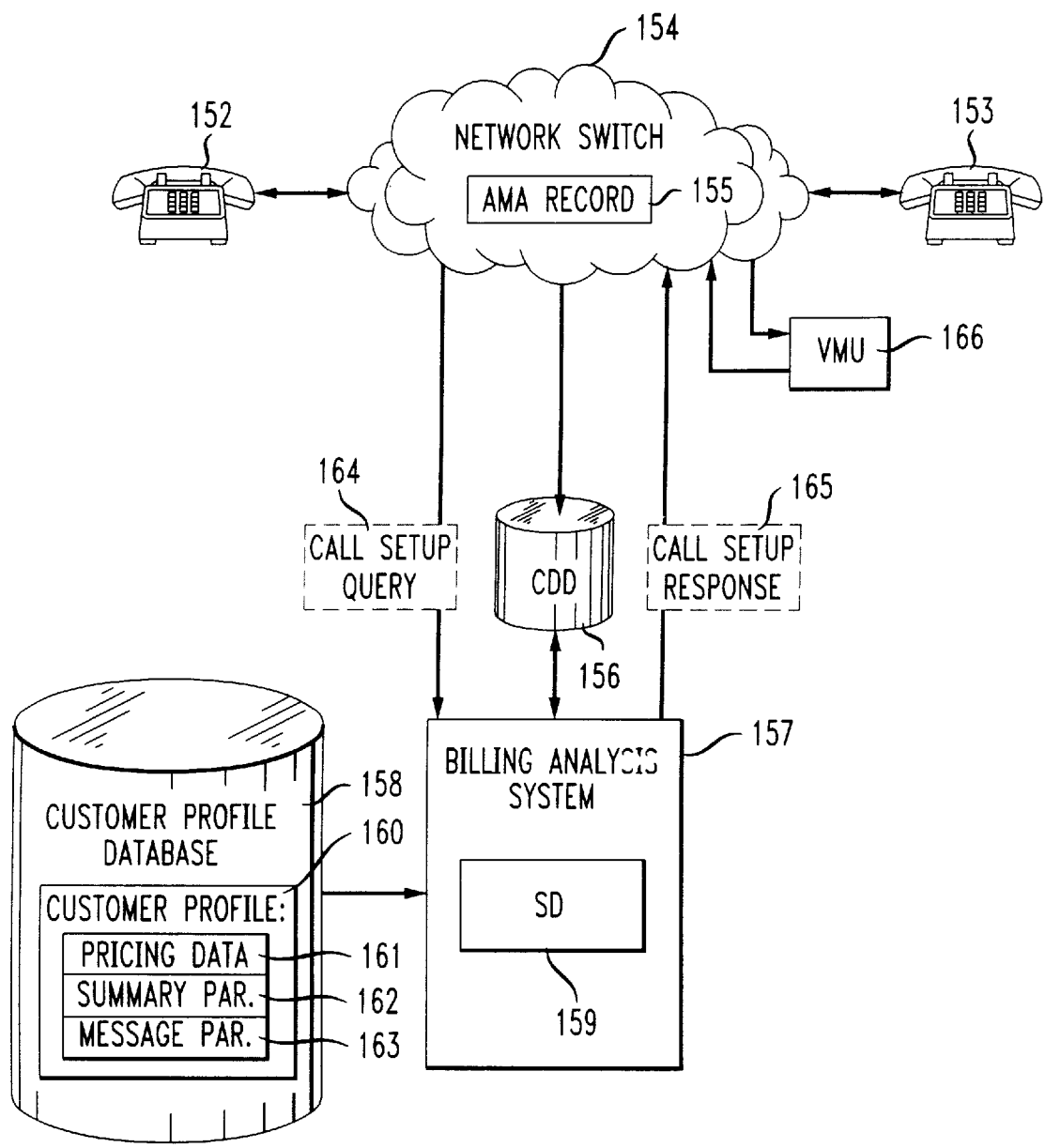
FIG. 1*b* is a block diagram of the telephone call billing system of FIG. 1*a*, showing a customer profile including summary parameters according to the present invention.

The processing involved in customer profile based customized messaging is shown in FIG. 1b, which, as an example, shows the present invention implemented in the telephone billing system of FIG. 1a. The present invention may be similarly implemented in the telephone billing systems shown in FIGS. 3 and 4.

The processing involved in customer profile based customized messaging includes two phases: the call setup phase and the call completion phase. The call completion phase begins once a billable call has occurred. Typically, a billable call occurs once a call has been completed from a calling station to a destination station, for example from calling station 152 to destination station 153. Once a billable call occurs, network switch 154 generates a corresponding AMA record 155. The AMA record includes an indication of the customer that placed the call. Typically the Automatic Number Identification (ANI) is used for this purpose. Each AMA record is passed to CDD 156, making the record available for call pricing. Each AMA record is passed from CDD 156 to billing analysis system 157, which applies the customer specific billing parameters contained in the attached customer profile database, such as database 158. The billing analysis system 157 then generates updates to summary information stored in the summary database (SD) 159 based on the customer profile 160 stored in customer profile database 158. The updates to the summary information are generated in real-time as calls are placed and AMA records generated. Updated summary information is available for access immediately after a summary information update is entered into SD 159. Thus, updated summary information may be accessed whenever desired. For example, a bill may be generated in real-time upon demand of a customer. Summary information stored in SD 159 may also be made available to customers without generating a bill. Snapshot summaries, of the current status of the customer's account, may be generated.

Customer profile 160 includes pricing data 161 that is used to price each telephone call and summary parameters 162 that define the summary information that is generated for the customer. Customer profile 160 may also include message parameters 163 that specify summary information that is to be included in the audio message played to the customer.

Pricing data 161 includes parameters specifying how the price of each telephone call is to be determined, based on the telephone billing plans to which the customer subscribes. The priced call value is used to generate updated summary information, such as total telephone usage for the billing period. Summary information may be also be compiled based on other aspects of the subscribed telephone billing plan, as defined by summary parameters 162, such as the total cost of calls made to each of a given set of numbers, area codes, cities, states, countries, etc., on the time or cost of calls in one or more discount plans, or based on the type of calls made, such as collect calls, etc.

In addition to the priced call value determined according to the billing plan to which the customer subscribes, billing analysis system 157 may also generate exemplary summary information based on other billing plans which may be available. The exemplary summary information based on these other billing plans may also be stored in SD 159. Exemplary summary information that is to be generated is also specified by summary parameters 162.

The call setup phase occurs once a call from a calling station has been routed to network switch 154, before the call is completed to a destination station. For example, a customer places a call from calling station 152 to destination station 153. The call is routed to a network switch 154, which generates a call setup query 164, beginning the call setup phase. Switch 154 transmits query 164 to billing analysis system 157. The call setup query includes information identifying the customer that placed the call and may include other information, such as information identifying the destination of the call and information identifying the summary information that is to be included in the message that is to be played to the customer.

Upon receiving query 164, billing analysis system accesses summary database 159 and obtains the customer's summary information. Billing analysis system 157 selects the summary information that is to be included in the message that is to be generated and played to the customer. The summary information to be included may be specified by the call setup query 164, message parameters 163, or default programming present in billing analysis system 157. Billing analysis system 157 may also perform calculations on the selected summary information, such as determining the difference between the customer's current balance and an exemplary balance based on another calling plan. Any calculations performed may be specified by the call setup query 164, message parameters 163, or default programming present in billing analysis system 157.

Billing analysis system 157 generates a call setup response 165 including the specified summary information and transmits response 165 to network switch 154. Upon receiving response 165, network switch 154 passes the summary information from response 165 to voice messaging unit (VMU) 166. VMU 166 generates a voice message based on the billing information and plays the message to the caller at station 152 through network switch 154.

For example, the summary information may be specified as the customer's current balance for all calls and the customer's exemplary balance under an exemplary billing plan. In this example, in the call completion phase of each call made by the customer, billing analysis system 157 would generate a summary information update representing the customer's new balance and a summary information update representing the customer's exemplary balance under the exemplary billing plan. In the call setup phase, billing analysis system 157 would generate a call setup response including the customer's current balance and the customer's exemplary balance. VMU 166 would then generate a message including the customer's current balance and the customer's exemplary balance and play the message to the customer.

Figure 2A:
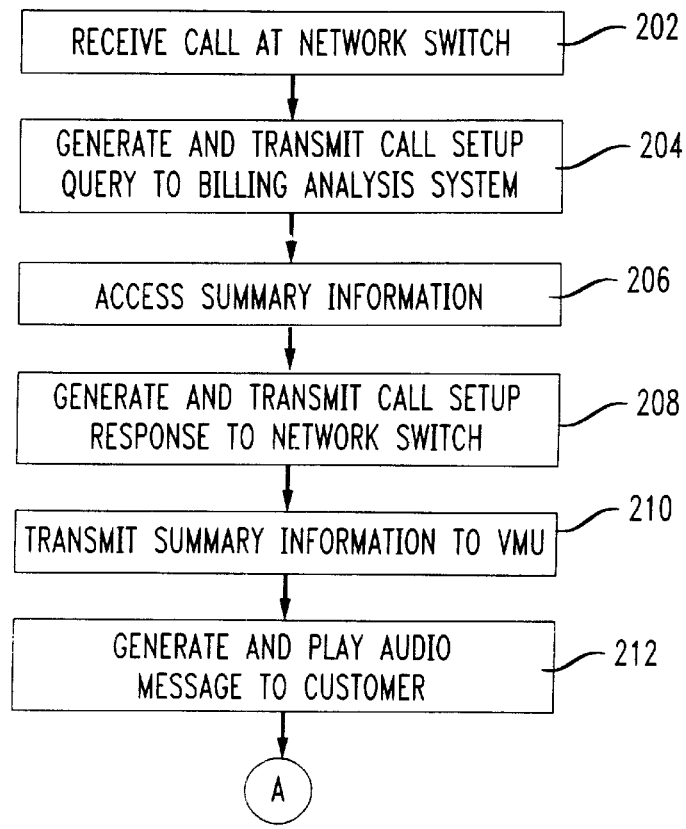
FIGS. 2*a* and 2*b* are a flow diagram of the operation of a customer profile based customized messaging process according to the present invention.
Figure 2B:
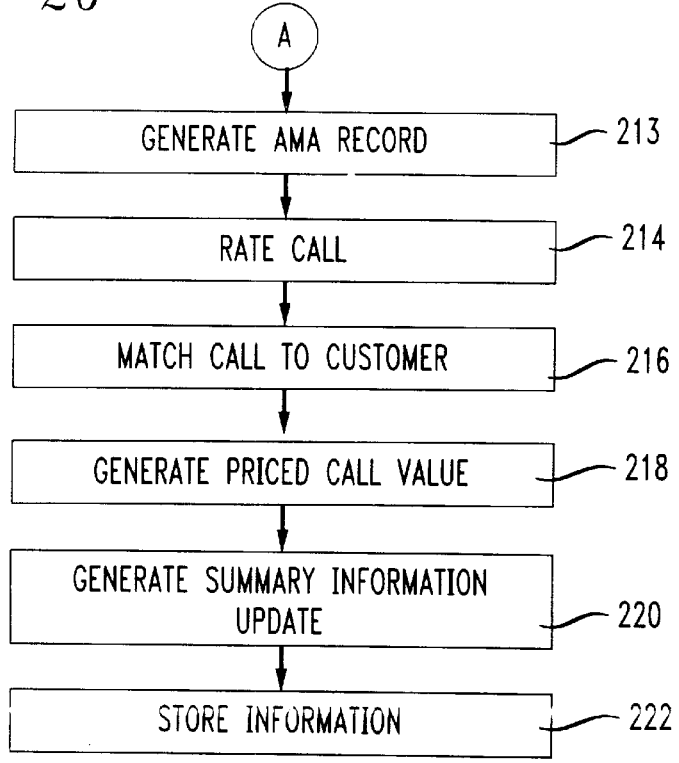

FIGS. 2a and 2b show, in flowchart form, a procedure that a billing analysis system may use to perform customer profile based customized messaging for each call. The call setup phase is shown in FIG. 2a and the call completion phase is shown in FIG. 2b. In the following description of the flowchart, references will be made to the embodiment shown in FIG. 1b.

Referring to FIG. 2a, the process begins with step 202, in which a call is received at a network switch 154. In step 204, network switch 154 generates and transmits a call setup query 164 to a billing analysis system 157. Call setup query 164 includes information identifying the customer that placed the call and may include other information, such as information identifying the destination of the call and information specifying the summary information that is to be included in the audio message that is to be played to the customer. Summary information to be included in the audio message may also be specified by message parameters 163, or default summary information may be specified for all customers by programming in billing analysis system 157.

In step 206, billing analysis system 157 accesses the summary database 159 and obtains the specified summary information. If summary information is specified by message parameters 163, billing analysis system 157 accesses message parameters 163 to obtain the specifications. In step 208, billing analysis system 157 generates a call setup response 164 including the specified summary information. Billing analysis system 157 then transmits call setup response 165 to the network switch 154. In step 210, network switch 154 extracts the summary information from call setup response 164 and transmits the summary information to VMU 165. In step 212, VMU 165 generates and plays an audio message including the summary information to the customer.

Turning now to FIG. 2b, the process continues with step 213 in which network switch 154 generates and AMA record and transmits it to billing analysis system 157. In step 214, billing analysis system 157 rates the call. In step 216, billing analysis system 157 matches the rated call to the customer, so that customer specific parameters can be applied to the call.

Several well known techniques can be used to match the rated call to the customer. One such technique uses Automatic Number Identification (ANI). In an ANI system, the number of the telephone station from which a call is initiated is determined and used to identify the party who initiated the call. Accordingly, in the FIG. 1b embodiment, the number of a telephone, such as 152 may be determined and passed to the billing analysis system along with the AMA record. The billing analysis system may then cross-reference the number to the customer profile containing the customer specific data to be used for the current call. For example, AMA record 155 is cross-referenced to customer profile 160, which also relates to that customer. Customer profile 160 contains customer specific pricing data 161 that is used to price the call, as well as summary parameters 162 that define the summary information that is to be generated. Once the appropriate profile, or profiles, if there are multiple customer profile databases, have been determined, then in step 218, the billing analysis system applies the pricing data contained in the profiles to the rated call to produce a priced call value. In step 220, the billing analysis system generates summary information updates defined by the summary parameters based on the priced call value. In step 224, the priced call value (processed AMA record) is stored in the CDD and the summary information update for the customer is stored in the SD. Once the summary information update is stored, the updated summary information is available for use in call setup processing, as shown in FIG. 2a.

As described in relation to FIG. 1a, an alternative scheme is to store both the priced call value and current bill—collectively termed "the priced call data"—in the SD; in which case, step 222 would involve storing the priced call value and the current bill in the SD.

Figure 2C:
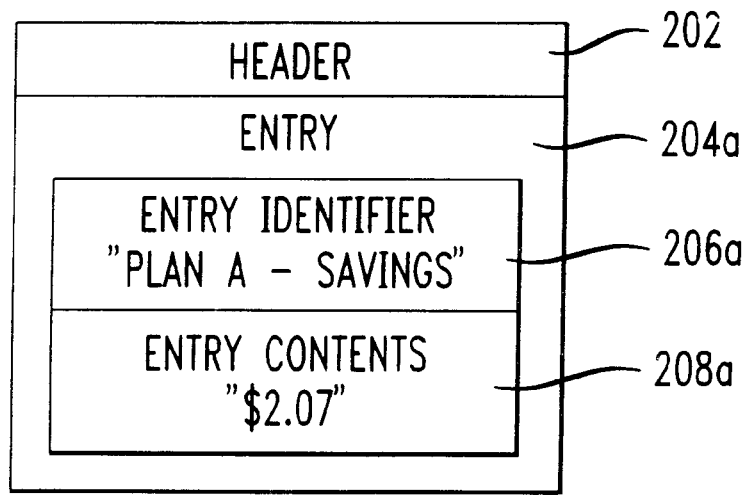
FIG. 2*c* is an exemplary format of a call setup response, according to the present invention.
Figure 2C:
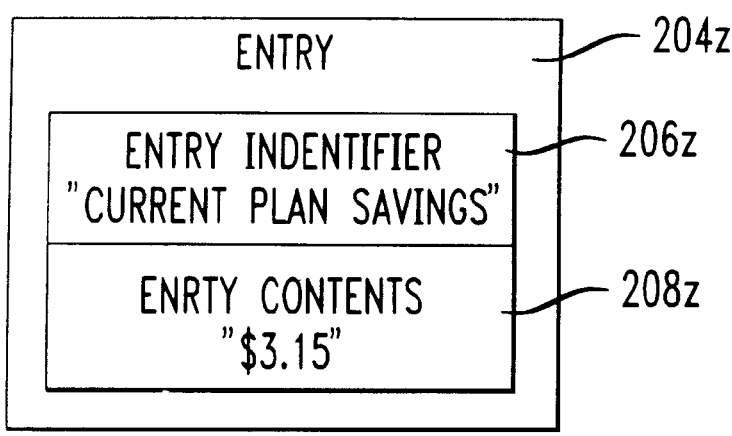

Referring now to FIG. 2c, an exemplary format of a call setup response 165 is shown. Response 165 includes a header, which identifies the response 165 as a call setup response. Response 165 also includes one or more entries, such as entries 204a–z. Each entry includes an entry identifier, such as identifiers 206a–z, and entry contents, such as contents 208a–z. The entry identifier identifies the entry contents. In an example shown in FIG. 2b, entry identifier 206a indicates that the entry contents represent the savings the customer would have had during the current billing period if the customer subscribed to calling plan A. The entry contents 208a are the indicated savings, here, $2.07. Voice messaging unit (VMU) 166 generates a message communicating the indicated information, such as:

"You would have saved $2.07 this billing period if you subscribed to billing plan A. For more information about this or other billing plans, please call 1-800-555-5555."

As seen in the above example, the message may also include information other than that information included in call setup response 165.

In another example shown in FIG. 2c, entry identifier 206z indicates that the entry contents represent the savings the customer achieved with the currently subscribed billing plan. The entry contents 208z are the indicated savings, here, $3.15. VMU 166 generates a message communicating the indicated information, such as:

"You saved $3.15 by subscribing to your current billing plan."

The information included in call setup response 165 may relate to any summary or exemplary information that may be generated by billing analysis system 157. For example, information or exemplary information relating to account balances, total usage, total billing plan usage, usage during a billing or promotional period, billing plan usage during a billing or promotional period, total savings, savings during a billing or promotional period, etc., may be generated and included. Other information, such as promotional information about products and services, ordering information and ordering telephone numbers, etc., may also be provided. The generated and included information may be selected by the telephone network operator or by the customer.

Figure 3:
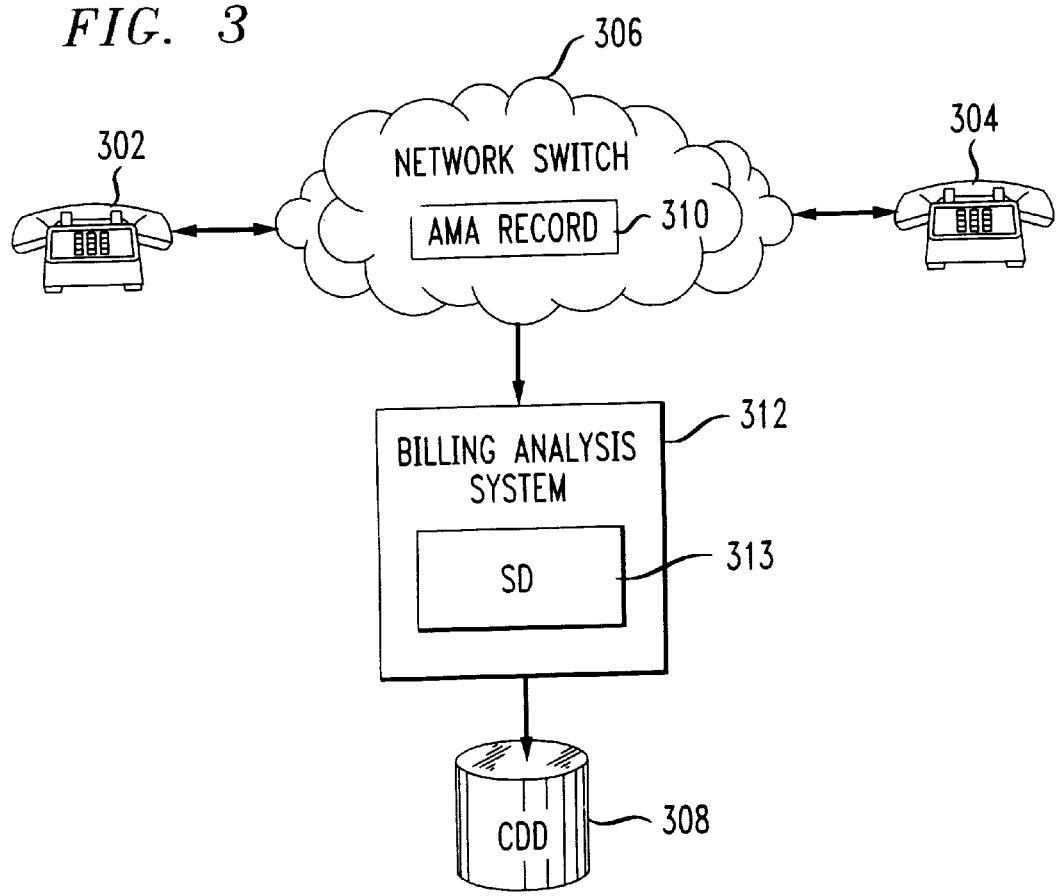
FIG. 3 is a block diagram of another embodiment of a telephone call billing system, in which the present invention may be implemented.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific pricing data to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile—although, it should be noted that for simplicity of presentation the individual customer profile databases and the bill generation system are not shown in FIG. 3, nor in the figures that follow. Also, like the billing analysis system of FIG. 1a, the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

Figure 4:
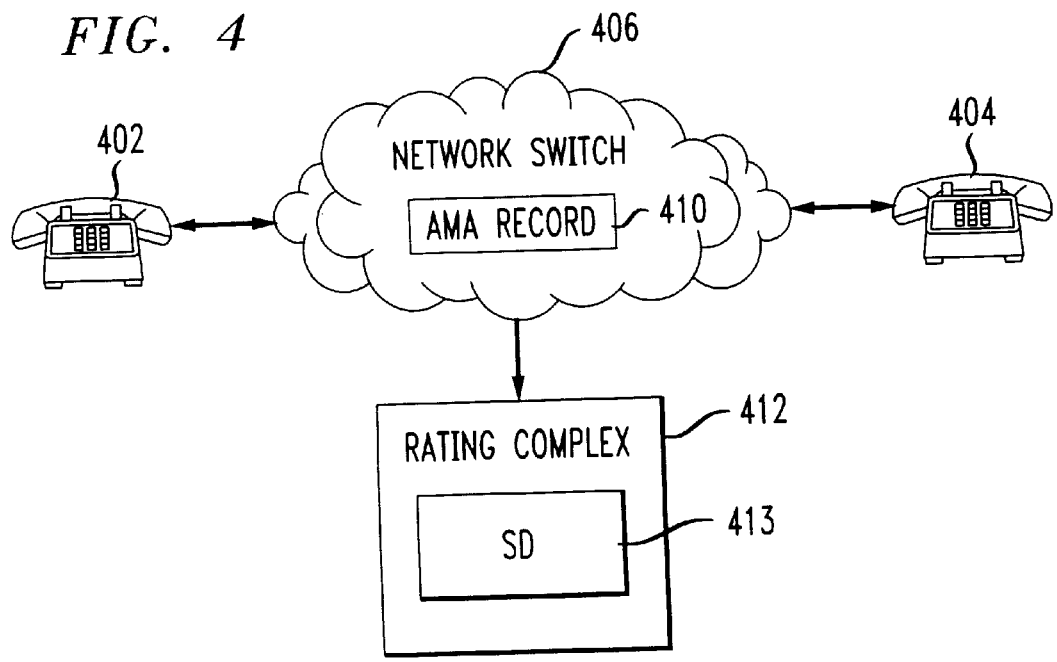
FIG. 4 is a block diagram of another embodiment of a telephone call billing system, in which the present invention may be implemented.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of telephone call processing comprising the steps of:

storing summary parameters that define summary information that is to be generated for a customer;

storing summary information for the customer, the summary information comprising exemplary summary information relating to a telephone billing plan other than a current telephone billing plan of the customer the summary information generated as specified by the summary parameters and accumulated as calls are placed by the customer and rated in real-time receiving a call from the customer at a network switch; and during a call setup phase, before the call has been completed to a destination station, performing the steps of:

transmitting information identifying the customer to a billing analysis system, transmitting the summary information for the customer, including the exemplary summary information, to the network switch, and transmitting the summary information, including the exemplary summary information, to the customer.

2. The method of claim 1, wherein the step of transmitting the exemplary summary information to the customer comprises the step of:

playing an audio message based on the exemplary summary information to the customer.

3. The method of claim 1, wherein the exemplary information comprises exemplary usage based on a telephone billing plan.

4. The method of claim 1, wherein the summary information further comprises actual summary information.

5. The method of claim 4, wherein the actual summary information comprises actual usage.

6. The method of claim 1, wherein the summary information includes actual summary information and exemplary summary information and the storing step comprises the steps of:

generating actual summary information for the customer based on a current telephone billing plan of the customer;

generating exemplary summary information for the customer based on an exemplary telephone billing plan; and storing the summary information for the customer.

7. The method of claim 6, wherein the exemplary summary information comprises:

an exemplary balance for the customer based on the exemplary telephone billing plan.

8. The method of claim 6, wherein the exemplary summary information comprises:

a difference between an actual balance of the customer and an exemplary balance for the customer based on the exemplary telephone billing plan.

9. A system for telephone call processing comprising:

a database storing summary parameters that define summary information that is to be generated for a customer and summary information for the customer, the summary information comprising exemplary summary information relating to a telephone billing plan other than a current telephone billing plan of the customer, the summary information generated as specified by the summary parameters and accumulated as calls are placed by the customer and rated in real-time;

a network switch receiving a call from the customer and, during a call setup phase, before the call has been completed to a destination station, transmitting information identifying the customer to a billing analysis system;

a billing analysis system, during the call setup phase, before the call has been completed to the destination station, accessing the database to obtain the summary information for the customer and transmitting the summary information, including the exemplary summary information, to the network switch; and a device, coupled to the network switch, during the call setup phase, before the call has been completed to the destination station, transmitting the exemplary summary information, including the exemplary summary information, to the customer.

10. The system of claim 9, wherein the device transmitting the exemplary summary information to the customer comprises:

a voice messaging unit receiving the exemplary summary information from the network switch and playing an audio message based on the exemplary summary information to the customer through the network switch.

11. The system of claim 9, wherein the exemplary summary information comprises exemplary usage based on a telephone billing plan.

12. The system of claim 9, wherein the summary information further comprises actual summary information.

13. The system of claim 12, wherein the actual summary information comprises actual usage.

14. The system of claim 9, wherein the summary information includes actual summary information and exemplary summary information and the billing analysis system further:
  generates actual summary information for the customer based on a current telephone billing plan of the customer;
  generates exemplary summary information for the customer based on an exemplary telephone billing plan; and
  transmits the summary information for the customer to the database for storage.

15. The system of claim 13, wherein the exemplary summary information comprises:
  an exemplary balance for the customer based on the exemplary telephone billing plan.

16. The system of claim 14, wherein the exemplary information comprises:
  a difference between an actual balance of the customer and an exemplary balance for the customer based on the exemplary telephone billing plan.

17. A system for telephone call processing comprising:
  means for storing summary parameters that define summary information that is to be generated for a customer;
  means for storing summary information for the customer, the summary information comprising exemplary summary information relating to a telephone billing plan other than a current telephone billing plan of the customer, the summary information generated as specified by the summary parameters and accumulated as calls are placed by the customer and rated in real-time;
  means for receiving a call from the customer and, during the call setup phase, before the call has been completed to the destination station, transmitting information identifying the customer;
  means for, during the call setup phase, before the call has been completed to the destination station, receiving the information identifying the customer, accessing the stored summary information for the customer and transmitting the summary information, including the exemplary summary information; and
  means for, during the call setup phase, before the call has been completed to the destination station, receiving the summary information, including the exemplary summary information, and transmitting the summary information to the customer.

18. The system of claim 17, wherein the exemplary summary information comprises exemplary usage based on a telephone billing plan.

19. The system of claim 17, wherein the summary information further comprises actual summary information.

20. The system of claim 19, wherein the actual summary information comprises actual usage.

21. The system of claim 17, wherein the summary information includes actual summary information and exemplary summary information and the storing means comprises:
  means for generating actual summary information for the customer based on a current telephone billing plan of the customer; and
  means for generating exemplary summary information for the customer based on an exemplary telephone billing plan.

22. The system of claim 20, wherein the exemplary summary information comprises:
  an exemplary balance for the customer based on the exemplary telephone billing plan.

23. The system of claim 20, wherein the exemplary information comprises:
  a difference between an actual balance of the customer and an exemplary balance for the customer based on the exemplary telephone billing plan.

24. The system of claim 17, wherein the means for transmitting the exemplary summary information to the customer comprises:
  means for playing an audio message based on the exemplary summary information to the customer.

25. A method of telephone call processing comprising the steps of:
  storing summary parameters that define summary information that is to be generated for a customer;
  generating actual summary information for the customer based on a current telephone billing plan of the customer, including actual usage, the actual summary information generated as specified by the summary parameters and accumulated as calls are placed by the customer and rated in real-time;
  generating exemplary summary information for the customer based on an exemplary telephone billing plan other than a current telephone billing plan of the customer, including an exemplary balance for the customer based on the exemplary telephone billing plan and a difference between an actual balance of the customer and an exemplary balance for the customer based on the exemplary telephone billing plan, the exemplary summary information generated as specified by the summary parameters and accumulated as calls are placed by the customer and rated in real-time;
  storing the summary information for the customer;
  receiving a call from the customer at a network switch; and
  during a call setup phase, before the call has been completed to a destination station, performing the steps of:
  transmitting information identifying the customer to a billing analysis system,
  transmitting the summary information for the customer, including the exemplary summary information, to the network switch, and
  transmitting the summary information, including the exemplary summary information, to the customer by playing an audio message based on the exemplary summary information to the customer.

26. A system for telephone call processing comprising:
  a database storing summary parameters that define summary information that is to be generated for a customer and summary information for the customer, the summary information comprising exemplary summary information for the customer based on an exemplary telephone billing plan other than a current telephone billing plan of the customer, including an exemplary balance for the customer based on the exemplary telephone billing plan and a difference between an actual balance of the customer and an exemplary balance for the customer based on the exemplary telephone billing plan and actual summary information for the customer based on a current telephone billing plan of the customer, including actual usage, the exemplary summary information and the actual summary information generated as specified by the summary parameters and accumulated as calls are placed by the customer and rated in real-time;

a network switch receiving a call from the customer and, during a call setup phase, before the call has been completed to a destination station, transmitting information identifying the customer to a billing analysis system;

a billing analysis system, during the call setup phase, before the call has been completed to the destination station, accessing the database to obtain the summary information for the customer and transmitting the summary information, including the exemplary summary information, to the network switch; and a device, coupled to the network switch, during the call setup phase, before the call has been completed to the destination station, transmitting the exemplary summary information, including the exemplary summary information, to the customer by playing an audio message based on the exemplary summary information to the customer.

27. A system for telephone call processing comprising:

means for storing summary parameters that define summary information that is to be generated for a customer;

means for generating actual summary information for the customer based on a current telephone billing plan of the customer, including actual usage, the actual summary information generated as specified by the summary parameters and accumulated as calls are placed by the customer and rated in real-time;

means for generating exemplary summary information for the customer based on an exemplary telephone billing plan other than a current telephone billing plan of the customer, including an exemplary balance for the customer based on the exemplary telephone billing plan and a difference between an actual balance of the customer and an exemplary balance for the customer based on the exemplary telephone billing plan, , the exemplary summary information generated as specified by the summary parameters and accumulated as calls are placed by the customer and rated in real-time;

means for storing the summary information for the customer;

means for receiving a call from the customer and, during the call setup phase, before the call has been completed to the destination station, transmitting information identifying the customer;

means for, during the call setup phase, before the call has been completed to the destination station, receiving the information identifying the customer, accessing the stored summary information for the customer and transmitting the summary information, including the exemplary summary information; and means for, during the call setup phase, before the call has been completed to the destination station, receiving the summary information, including the exemplary summary information, and transmitting the summary information to the customer by playing an audio message based on the exemplary summary information to the customer.

* * * * *